(12) United States Patent
Paul et al.

(10) Patent No.: US 7,686,384 B2
(45) Date of Patent: Mar. 30, 2010

(54) SPOILER

(75) Inventors: Joachim Paul, Stuttgart (DE); Sascha Marzia, Munich (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 12/136,411

(22) Filed: Jun. 10, 2008

(65) Prior Publication Data

US 2009/0160213 A1    Jun. 25, 2009

(30) Foreign Application Priority Data

Jul. 5, 2007    (DE) .................. 10 2007 031 408

(51) Int. Cl.
*B62D 35/00* (2006.01)
(52) U.S. Cl. ................... 296/180.5; 180/68.1
(58) Field of Classification Search ............. 296/180.5, 296/180.3; 180/68.1
See application file for complete search history.

(56) References Cited

U.S. PATENT DOCUMENTS 4,887,681 A * 12/1989 Durm et al. ............... 180/68.1
4,889,382 A * 12/1989 Burst et al. .............. 296/180.5
5,923,245 A * 7/1999 Klatt et al. ................. 340/479

FOREIGN PATENT DOCUMENTS

| DE | 3735185 A1 | 5/1989 |
|---|---|---|
| DE | 196 52 692 C2 | 6/1998 |
| DE | 10130405 A1 | 1/2003 |
| DE | 10156195 B4 | 4/2006 |
| DE | 60127952 T2 | 1/2008 |
| EP | 0398784 A1 | 11/1990 |
| EP | 1733922 A1 | 12/2006 |
| WO | 01/84021 A1 | 11/2001 |

OTHER PUBLICATIONS

German Search Report dated Feb. 2, 2009.
European Search Report dated May 15, 2009.

* cited by examiner

*Primary Examiner*—Joseph D Pape

(57) ABSTRACT

A spoiler device, especially a rear spoiler, is adjustable between a non-usage setting and at least one usage setting. The rear spoiler is joined at its rear end area as viewed in the direction of travel via a covering device having a folded structure with a body, especially with a trunk lid of a motor vehicle. The covering device is embodied as a two-component part.

11 Claims, 3 Drawing Sheets

SPOILER

CROSS-REFERENCE TO RELATED APPLICATION

This application claims the priority, under 35 U.S.C. §119, of German application DE 10 2007 031 408.8, filed Jul. 5, 2007; the prior application is herewith incorporated by reference in its entirety.

BACKGROUND OF THE INVENTION

Field of the Invention

The present invention relates to a spoiler adjustable between a non-usage setting and at least one usage setting, which, on its rear end are as viewed in the direction of travel is joined via a covering device having a folded structure with a trunk lid of a motor vehicle.

Especially on sports cars, to improve road holding at high speeds, a spoiler is placed in the rear, in everyday speech also called a rear spoiler. The rear spoiler exerts a speed-dependent tread pressure of the vehicle on the road, thus causing wheel grip to improve. Here a difference is made between fixed and deployable rear spoilers, with the latter especially often having a covering device on their rear end area as viewed in the direction of travel, by which the rear spoiler is joined to the vehicle's trunk lid, and which protects mechanical devices found under the rear spoiler or a fan or air filter channel from becoming contaminated.

A vehicle is known from German patent DE 196 52 692 C1 (corresponding to U.S. Pat. No. 5,923,245) with a deployable spoiler in the rear area and at least one elongated extra brake light. A rear edge area of the deployed rear spoiler is connected by an accordion-like covering device with a flange of the trunk lid. The accordion-like configuration of the covering device ensures stepless adaptation of same to varied deployment states of the rear spoiler. Usually the covering device extends over the entire width of the rear spoiler, and therefore to ensure a reliable protection of the parts beneath it from becoming soiled, a soft plastic material can be used for the covering device, with individual folds of the covering device drooping down and resulting in a negative esthetic effect.

BRIEF SUMMARY OF THE INVENTION

It is accordingly an object of the invention to provide a spoiler which overcomes the above-mentioned disadvantages of the prior art devices of this general type.

With the foregoing and other objects in view there is provided, in accordance with the invention, an adjustable spoiler device configuration. The configuration includes an adjustable spoiler device adjustable between a non-usage setting and at least one usage setting. The adjustable spoiler device has a rear end area as viewed in a direction of travel. A covering device is joined to the rear end area and has a folded structure for connecting to a body, the covering device is a two-component part.

The invention is based on the general concept of configuring a covering device that has a folded structure, which on the one side is joined to an adjustable rear spoiler and on the other side to the body of the motor vehicle, as a two-component piece, thereby being able to have individual influence on the stiffness of the folded structure. The rear spoiler is adjustable between a non-usage setting, also called a static setting, and at least one usage setting, with the covering device placed on the rear end of the rear spoiler, as viewed in the direction of travel, and able to prevent soiling of the parts lying beneath the deployed rear spoiler. For example, by configuring it as a two-component part, it is possible to partially stiffen the folded structure of the covering device, and effectively prevent the individual lamellae from drooping down which creates an esthetically negative impression. In contrast to customary reinforcement pieces such as metal inserts, the invention-specifically configured covering device offers a great advantage in that the individual lamellae are reinforced with an extremely small amount of additional weight, and at the same time the entire covering device is easy to manufacture, without, for example, having to insert the reinforcing parts in a spray form for the covering device.

It is appropriate for the covering device to be produced from two plastic components, with a first plastic component extending over the entire folded structure, meaning over the joints of same and over the lamellae running between the joints, while a second plastic component, harder than the first, is provided only in the area of the lamellae for reinforcement of same. The first, or soft, plastic component is thus provided to run all the way over the covering device, while the second, or harder, plastic component, is provided only at the places to be reinforced, especially on the lamellae. By this, an individual reinforcement can be attained, whereby, for example, it is conceivable that the invention-specific second plastic component is provided only on every second lamella, or on every lamella, through which the stiffness behavior of the individual lamellae can be individually influenced also. The first plastic component is so soft that in the area of the joints it permits an effortless bending of the individual folds and thus an effortless folding of the covering device. Using the two plastic components, a covering device is created that on the one hand has sufficient flexibility, and on the other hand also sufficient stiffness.

It is appropriate for the first plastic component to be a thermoplastic elastomer and the second plastic component to be a thermoplast, especially polypropylene. Thermoplastic elastomers are plastics that behave in a manner comparable to classic elastomers at room temperature, but undergo plastic deformation when heated. Owing to the very short cycle times, through the plastic-like production process, very high cycle times are attained, which leads indirectly to a lowering of production costs. In contrast, polypropylene has greater stiffness, hardness and durability than thermoplastic elastomers, and therefore is especially suited to reinforce the lamellae of the covering device. At the same time thermoplastic polypropylene is very thin, and thus very low in weight, which is a great advantage in constructing sports cars.

In another advantageous embodiment form of the invention-specific solution, an upper lamella of the folded structure of the covering device has at least one hook or at least one holding opening for attachment onto the rear spoiler. The at least one hook can, like the second plastic component, be sprayed onto the first plastic component, and thereby be joined simply to the folded structure. Here preferably the second, or harder plastic component can be used both for the reinforcement of the lamellae and to create the hook, so that preferably only two plastic components are used for the entire covering device. Naturally, similar hooks or holder openings can be provided on a lower lamella, via which the covering device can be joined to an assembly or a rear cover of the vehicle. By spraying the hook, its manufacture can be considerably optimized, so that in comparison to a separately mounted hook, an advantage in cost and time that is not to be underestimated is attainable.

Other features which are considered as characteristic for the invention are set forth in the appended claims.

Although the invention is illustrated and described herein as embodied in a spoiler, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
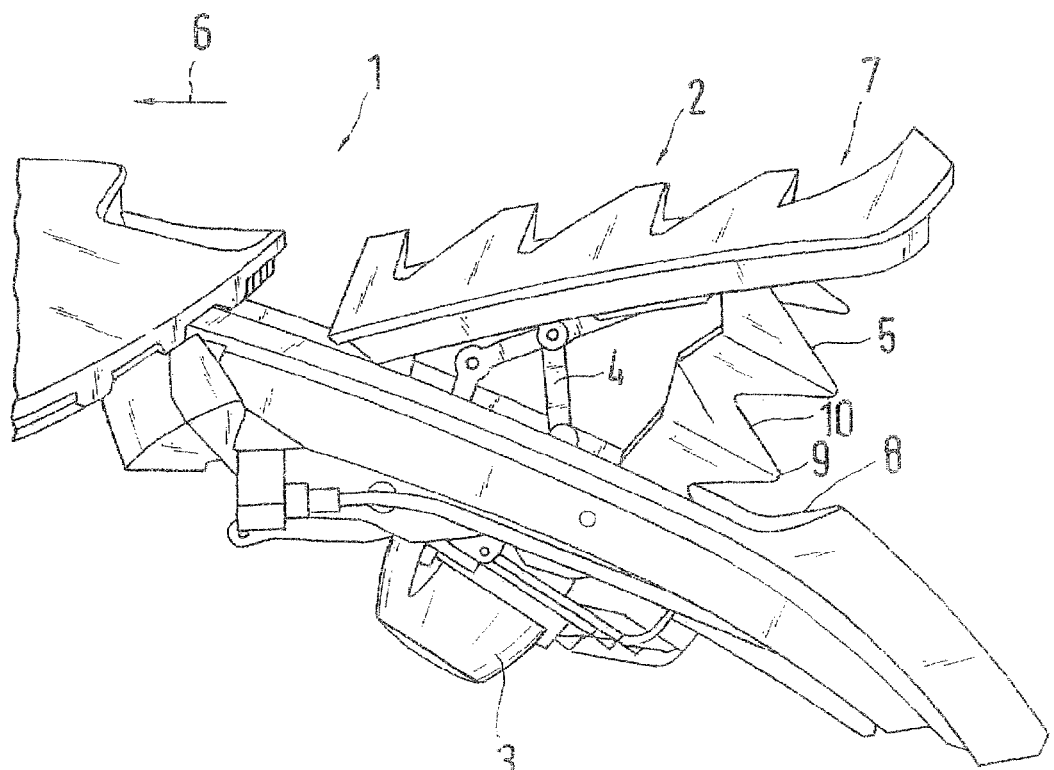
FIG. 1 is a diagrammatic, side perspective view of a covering device in an installed state according to the invention.
Figure 3:
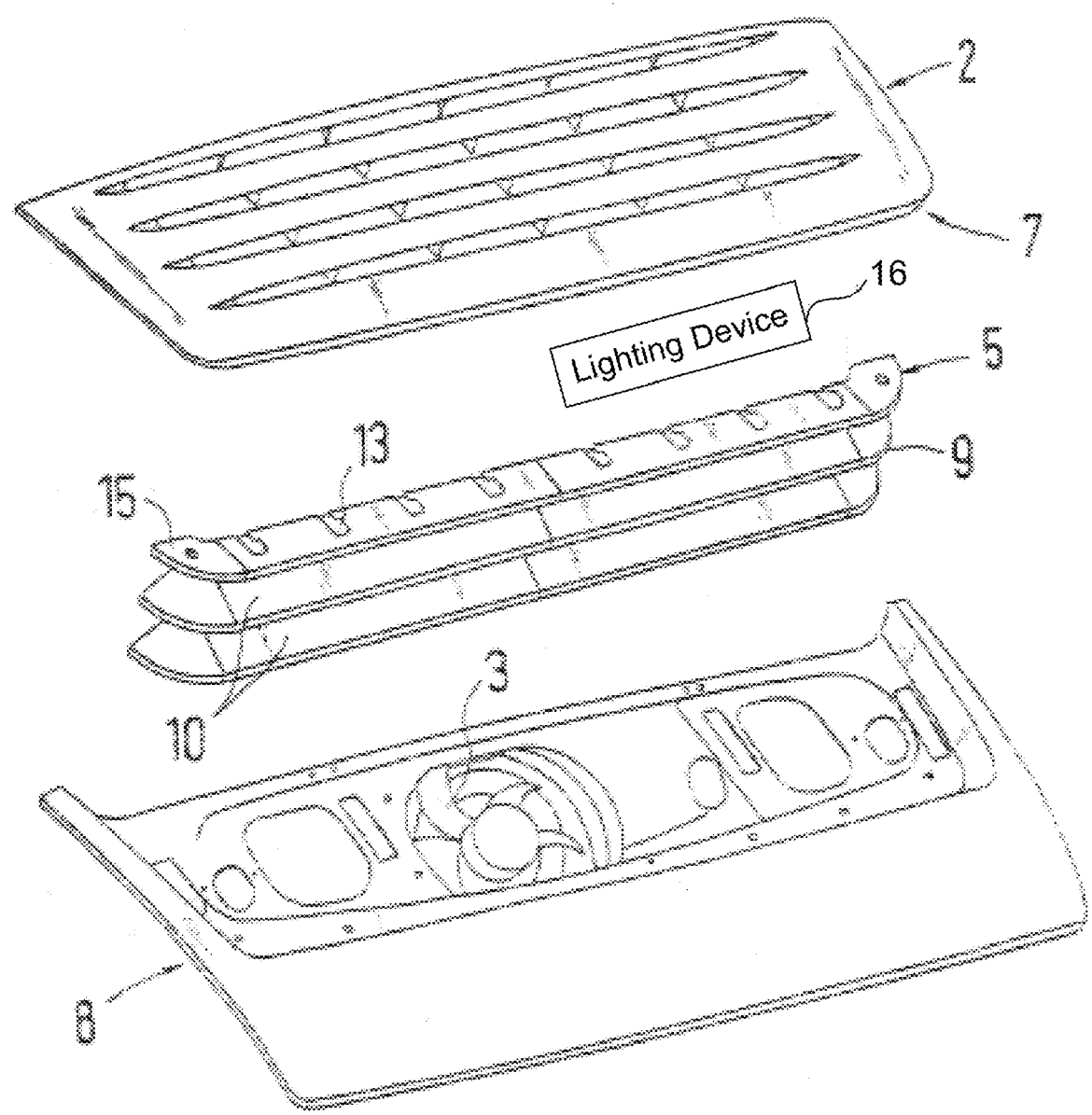
FIG. 3 is a diagrammatic, exploded, perspective view of a rear of a motor vehicle, with a rear spoiler and the specific covering device.
Figure 4:
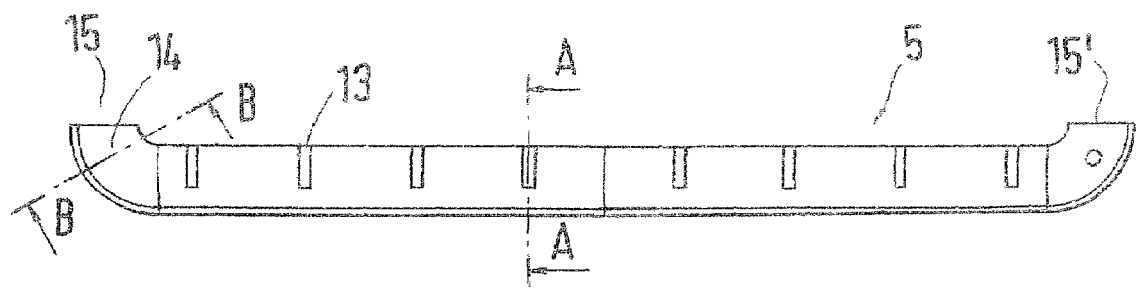
FIG. 4 is a diagrammatic, top plan view of the covering device.

Referring now to the figures of the drawing in detail and first, particularly, to FIG. 1 thereof, there is shown a motor vehicle 1 that in other respects is not depicted has a spoiler 2 in its rear that is adjustable between a non-usage setting and at least one usage setting. According to FIG. 1, the rear spoiler 2 is shown in a deployed position. The rear spoiler 2 is always deployed when an increased down force is to be generated on the motor vehicle 1, especially at higher speeds, and connected with that, better road grip is to be produced. Beneath the rear spoiler 2, various components are placed, such as a fan 3 or a lever mechanism 4 for positioning the rear spoiler 2, for which also see FIG. 3. So that, even with the rear spoiler 2 deployed, the components 3, 4 just named may be protected against soiling which is triggered, for example, by water swirling up at the rear, a covering device 5 is provided that has a fold structure, which covering device 5 at one end is attached onto a rear end area 7 of the rear spoiler 2 and at the other end onto the body 8 of the motor vehicle. For example, the body 8 can be a trunk lid.

To deploy the rear spoiler 2, the covering device 5 is configured to be flexible, and has individual lamellae 10 joined to each other via joints 9. Since normally the covering device 5 extends over the entire width of the rear spoiler 2, the covering device 5 should be configured to be not too soft, since the lamellae 10 otherwise droop down and result in an unesthetic appearance. On the other hand, the covering device 5 may not be configured to be too stiff, for otherwise it will no longer be possible to easily fold the covering device 5 when the rear spoiler 2 is deployed or retracted. For this reason, the covering device 5 is embodied as a two-component piece, and preferably is formed of two plastic components 11, 12, whereby a first plastic component 11 extents continuously over the joints 9 of the folded structure and over the lamellae 10 that run between the joints 9, while a second plastic component 12, harder than the first, is provided only in the area of the lamellae 10 for reinforcement of same, for which see FIGS. 5-6. For example, a thermoplastic elastomer is a possibility for the first plastic component 11, and a thermoplast, especially polypropylene, is a possibility for the second plastic component 12. Generally the folded structure of the covering device 5 can be manufactured by an injection molding process, whereby the second plastic component 12 can be sprayed onto the first plastic component 11.

Figure 2:
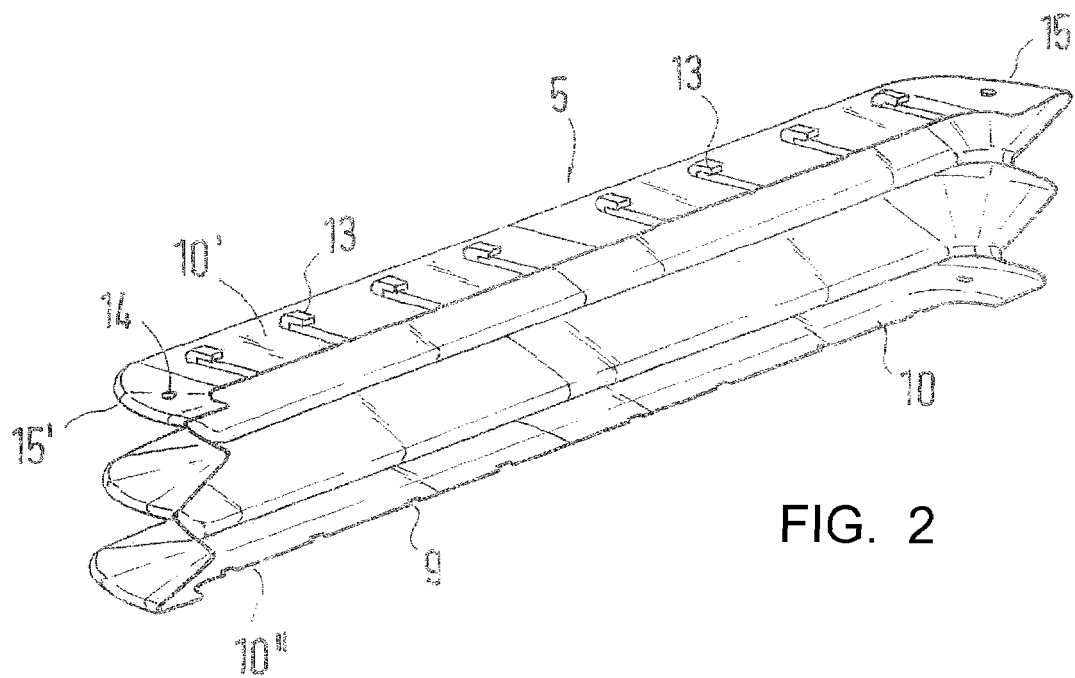
FIG. 2 is a diagrammatic, perspective view of the covering device.

FIG. 2 shows a possible embodiment of the covering device 5, whereby at least one hook 13, here a total of eight hooks 13, are provided on an upper lamella 10' of the folded structure, to attach the covering device 5 onto the rear spoiler 2. It is also conceivable that instead of the hooks 13, holding openings 14 are provided, with which hooks placed correspondingly on the rear spoiler 2 act in concert. In similar fashion, also on a lower lamella 10" of the folded structure, hooks 13 or holding elements 14 are provided to attach the covering device on the body or rear cover 8.

Figure 5:
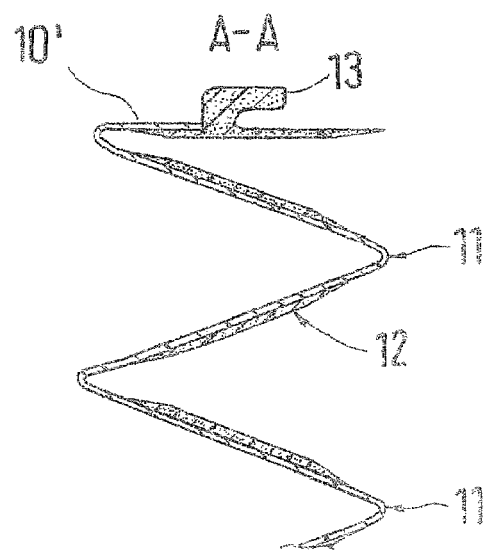
FIG. 5 is a sectional view of the covering device taken along the line A-A shown in FIG. 4.

As the cross-sectional depiction A-A in FIG. 5 shows, the hook 13 is an integral part of the second plastic component 12 or is sprayed on it. In addition, the first plastic component 11 is not situated so as to run continuously over the entire width of lamellae. In the B-B section depiction as per FIG. 6, this is different. On the front sides 15, 15', the first plastic component 11 is embodied to run continuously over the entire width of the uppermost lamella 10', just like the second plastic component 12.

Figure 6:
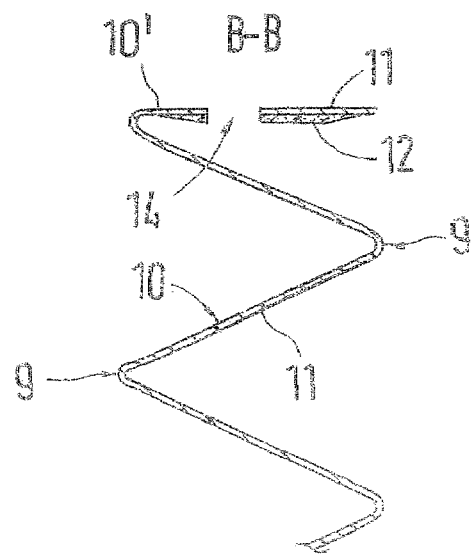
FIG. 6 is a sectional view of the covering device taken along the line B-B shown in FIG. 4.

According to FIGS. 2 and 4-6, the folded structure of the covering device 5 is embodied to be angled around, whereby in the angled area the lamellae 10—with the exception of the topmost lamella 10'—are merely embodied from the first, or softer plastic component 11. This is shown in FIG. 6 as per the sectional depiction B-B.

Due to the invention-specific embodiment of the covering device 5 as a two-component part, the weight can be reduced, mounting times can be shortened, and the complexity reduced. At the same time, the covering device 5 thus embodied has a higher stiffness than a covering device 5 made merely out of the first plastic component 11, and thus an improved stability. Along with these production and cost advantages, the invention-specific covering device 5 also has a smooth surface throughout, without visible edges and thus a configuration advantage.

According to an especially preferred embodiment form, in the area of at least one lamella 10 and/or of a joint 9, a lighting device 16 can be provided that is not designated in greater detail, which is embodied, for example, as a brake light or an illuminated emblem. So-called luminous foils, optical fibers or light-emitting diodes can be used, which participate if necessary in the deployment and retraction motions of the rear spoiler 2 and, linked with that, the accordion-like expansion and contraction of the covering device 5.

Instead of the lighted components, on at least one lamella 10 a color insert can be used, employing a dual color scheme or a nameplate.

The invention claimed is:

1. An adjustable spoiler device configuration, comprising:
   an adjustable spoiler device adjustable between a non-usage setting and at least one usage setting, said adjustable spoiler device having a rear end area as viewed in a direction of travel;
   a covering device joined to said rear end area and having a folded structure for connecting to a body, said covering device being a two-component part;
   said folded structure having joints and lamellae running between said joints; and
   said covering device containing two plastic components including a first plastic component extending continuously over said joints of said folded structure and over said lamellae, and a second plastic component, being harder than said first plastic component, said second plastic component disposed only in an area of said lamellae for reinforcement of said lamellae.

2. The adjustable spoiler device configuration according to claim 1, wherein said first plastic component is a thermoplastic elastomer, and said second plastic component is a thermoplast.

3. The adjustable spoiler device configuration according to claim 1, wherein:
   said lamellae include an upper lamella having one of at least one hook and at least one holding opening formed therein for attachment onto said adjustable spoiler device; and
   said lamellae include a lower lamella having one of at least one hook and at least one holding opening formed therein for attachment onto the body.

4. The adjustable spoiler device configuration according to claim 1, wherein said folded structure is manufactured by an injection molding process, and said second plastic component is sprayed onto said first plastic component, or vice versa.

5. The adjustable spoiler device configuration according to claim 1, wherein said folded structure has angled off front sides defining an angled-off area, in said angled-off area said lamellae are embodied merely from a soft plastic component.

6. The adjustable spoiler device configuration according to claim 1, further comprising a light device disposed in an area of at least one lamella of said lamellae.

7. The adjustable spoiler device configuration according to claim 6, wherein said light device is selected from the group consisting of a brake light and an illuminated emblem.

8. The adjustable spoiler device configuration according to claim 1, further comprising a color insert disposed in an area of at least one lamella of said lamellae.

9. The adjustable spoiler device configuration according to claim 1, wherein said second plastic component is formed from polypropylene.

10. The adjustable spoiler device configuration according to claim 1, wherein said lamellae include an upper lamella having at least one hook and at least one holding opening formed therein for attachment onto said adjustable spoiler device.

11. The adjustable spoiler device configuration according to claim 1, wherein said lamellae include a lower lamella having at least one hook and at least one holding opening formed therein for attachment onto the body.

* * * * *